(12) United States Patent
Bilinski et al.

(10) Patent No.: US 6,490,919 B2
(45) Date of Patent: Dec. 10, 2002

(54) WELL WATER LEVEL MEASUREMENT AND DISPLAY APPARATUS

(76) Inventors: Richard J. Bilinski, 866 Berne Dr., Auburn, PA (US) 17922; Juan Carlos Gonzales, 206 S. Margaretta St., Schuylkill Haven, PA (US) 17972

( * ) Notice: Subject to any disclaimer, the term of this patent is extended or adjusted under 35 U.S.C. 154(b) by 0 days.

(21) Appl. No.: 09/851,630

(22) Filed: May 9, 2001

(65) Prior Publication Data

US 2002/0166378 A1 Nov. 14, 2002

(51) Int. Cl.[7] ............................................. G01F 23/14
(52) U.S. Cl. ............................ 73/299; 73/301; 73/302
(58) Field of Search ............................. 73/37.5, 37.6, 73/299, 301, 708, 302

(56) References Cited

U.S. PATENT DOCUMENTS

| | | | | |
|---|---|---|---|---|
| 3,854,322 A | * | 12/1974 | Wood et al. ............... | 73/37.5 |
| 5,090,242 A | * | 2/1992 | Hilton ....................... | 73/302 |
| 5,094,102 A | * | 3/1992 | Fryer et al. ................ | 73/155 |
| 5,105,662 A | * | 4/1992 | Marsh et al. .............. | 73/299 |
| 5,163,324 A | * | 11/1992 | Stewart ..................... | 73/302 |
| 5,207,251 A | * | 5/1993 | Cooks ....................... | 41/83 |
| 5,261,276 A | * | 11/1993 | Gifford ..................... | 73/302 |
| 6,065,335 A | * | 5/2000 | Denz et al. ................ | 73/291 |
| 6,220,091 B1 | * | 4/2001 | Chen et al. ................ | 73/302 |

* cited by examiner

*Primary Examiner*—Hezron Williams
*Assistant Examiner*—Katina Wilson
(74) *Attorney, Agent, or Firm*—Sanford J. Piltch, Esq.

(57) ABSTRACT

A well water level sensing apparatus using a pressurized air column in contact with the water at its distal end to derive a correlated value dependent upon the length of the air column which is converted for retrieving stored water levels from memory and displaying the retrieved water levels on a visual display. The water level sensing apparatus may be manually initiated or programmatically controlled for continual monitoring.

9 Claims, 6 Drawing Sheets

WELL WATER LEVEL MEASUREMENT AND DISPLAY APPARATUS

CROSS-REFERENCE TO DISCLOSURE DOCUMENT

This application references Disclosure Document No. 478,776 filed Aug. 21, 2000.

BACKGROUND OF THE INVENTION

The invention generally resides in the field of instruments for measuring and displaying the level of a liquid in a containment vessel or a drilled well. A unique sensor system is employed to monitor, obtain depth (height) of the liquid (water) and transmit for display the determined depth (height) information to the user.

Over years varying types of instrumentation have been used to gauge the water level and available pressure in drilled wells so as to be able to determine water flow rate and capacity. The present invention enables the instrumentation and the apparatus needed to make such measurements.

Earlier devices for measuring water flow rate and well capacity were complicated and cumbersome to install and to maintain. One such device is that described in U. S. Pat. No. 5,105,662 [Marsh, et al.] which is suited for measuring the liquid level in a fixed dimension containment vessel, i.e. a fuel tank. Marsh, et al. discloses a system for measuring the level of a liquid material by direct pressure of the subject liquid against a pressure sensor balanced against a reference pressure in an air column. The reference pressure is based upon the static air pressure in the containment vessel holding the liquid as registered by the compression of the air column.

A second patent, U. S. Pat. No. 5,207,251 [Cooks], describes an automatic fill control for a liquid holding tank which uses a pressurized sensor to determine both flow rate and liquid level height. This is accomplished utilizing a gas bubble (column) as the correlating measurement device. Cooks describes a gas column as containing Nitrogen ($N_2$) which uses the gravimetric pressure of the liquid whose height (depth) is to be measured by being exerted against a second (pressure conducting) fluid. The second fluid, in turn, exerts pressure against a sensor. In this manner the primary pressure conducting fluid has its level of compression controlled by the pressure exerted against it by the fluid in the containment vessel which is used as a threshold for controlling a dispensing valve to add fluid to the vessel.

Finally, U. S. Pat. No. 5,901,603 [Fiedler] describes a hydrostatic pressure sensing device for measuring the height (depth) of a liquid in a containment vessel. The particular apparatus utilized comprises a pump for supplying pressurized air to a supply tank which is maintained at a 1.5 psi differential above the detected liquid pressure. Exiting the supply tank is an air supply line which is applied to one side of the hydrostatic pressure sensor. A temperature compensated solid state pressure transducer bleeds off or increases pressure by way of a manifold to maintain the appropriate pressure in the air supply. The reference side of the pressure sensor vents to the outside (ambient) air. The pressurized air supply line and the air reference ports are tied together through the manifold, also referred to as a drift compensation valve, so that the differential pressure transducer prevent drift by automatic correction and correlation of the pressures between the ambient (outside) air and the pressurized air column in the air supply line as applied to the pressure sensor which is submerged below the fluid level in the containment vessel.

In all of the foregoing devices, the complexity of the balancing of reference pressures against the variant pressures of the contained liquid require intermediate elements to counteract or to convey the pressure in order to obtain accurate results. The present invention creates a unique and simple series of elements for accurately determining the height of the water level in a drilled well and to instantaneously display, or continually record, that level for immediate of later use by the water user.

It is an object of the present invention to provide a simple system for measuring well water depth (height) utilizing a control circuit for determining the depth of the water by measuring the pressure of the water in a selectably dimensioned column and display such result instantaneously to the user.

It is also an object of the present invention to have the capacity to measure more than one well water level and to provide output control signals for communication with multi-purpose computers or to water flow rate controllers to regulate flow against demand.

It is a further object of the present invention to provide useful information to the display in the form of water flow rate (usage) in gallons, liters or feet per time segment, and to provide this information on a single inquiry or continuing inquiry basis.

It is a still further object of the present invention to provide a programmatically controlled water level measurement device which is capable of communicating with other computing devices as well as controlling and monitoring a plurality of measurements of for each of a plurality of wells.

Other objects will appear hereinafter.

SUMMARY OF THE INVENTION

A well water level sensing apparatus using a pressurized air column in contact with the water at its distal end to derive a correlated value dependent upon the length of the air column which is converted for retrieving stored water levels from memory and displaying the retrieved water levels on a visual display. The water level sensing apparatus may be manually initiated or programmatically controlled for continual monitoring.

The program control can be described as follows. Measuring the level of water in a well utilizing pressurized air comprises the steps of initializing a means for controlling the sensing and monitoring of the water level measurement which first reduces pressure in an air column inserted into a well to existing ambient pressure by closing a first valving means located between a pressure sensor and the air column to exhaust and isolate the air column. A second valving means located between a pump and an air tank of substantially equal volume as the air column is opened and the pump to charge the air tank to a predetermined measurement pressure is started. The second valving means is closed to isolate the air tank as the measurement pressure is detected by the pressure sensor. The first valving means is opened equalizing the measurement pressure between the air tank and the air column to obtain a direct pressure of the well water against the distal end of the air column. The pressure of the well water exerted against the air column is detected by the pressure sensor and the water level is calculated from the resultant sensed pressure. The calculated water level is then displayed on a visual display for viewing by a user. This method may further comprise continually sensing and monitoring the pressure of the well water exerted against the air column by repeating the sequence at preset periodic times.

The means for controlling the sensing and monitoring of the water level measurement may include a programmable computing device for controlling the sequence for measuring the well water depth using pressurized air. The controller may receive instructions over a communications channel from a multi-purpose computer to perform the well water depth measurements and providing well water depth measurements to said computer over said communications channel. The method may also include selectively sensing and monitoring the well water depth of a plurality of wells by repeating the measurement sequence for each well water depth measurement for each one of the plurality of wells.

The measurement may be accomplished by a number of elements for measuring well water depth using pressurized air which include a means for controlling the sensing and monitoring of water level measurements subject to program control for sequencing the order of operation of a first and a second valving means, an air tank, an air column, a pressure sensor, and a visual display. The first valving means is operatively connected between the pressure sensor and the air column, having its distal end inserted into a well, to reduce pressure in the air column to existing ambient pressure by exhausting said air and isolating the air column. The second valving means is operatively connected to a pump and an air tank of substantially equal volume as the air column, and to the pressure sensor, to couple the air tank to the air column upon the sensing of a predetermined measurement pressure being detected in the air tank by the pressure sensor. The pump is capable of charging the air tank to the predetermined measurement pressure. As above, the pressure sensor is capable of directly sensing the pressure of the well water exerted against the distal end of the air column, following the equalizing of the predetermined measurement pressure between the air tank and the air column, and to provide the sensed pressure to the controller for calculating the water level in the well from the sensed pressure. The controller will then display the calculated water level on the visual display.

The apparatus may be programmed for the controller to continually sense and monitor the pressure of the well water exerted against the distal end air column by repeating the sequence of operation at preset periodic times. The controller may also receive instructions over a communications channel from a multi-purpose computer to perform the well water depth measurements and provide well water depth measurements to said computer over said communications channel. The controller may also selectively sense and monitor the well water depth of a plurality of wells by repeating the sequence of operation for each well water depth measurement for each one of the plurality of wells.

BRIEF DESCRIPTION OF THE DRAWINGS

For the purpose of illustrating the invention, there is shown in the drawings forms which are presently preferred; it being understood, however, that the invention is not limited to the precise arrangements and instrumentalities shown.

DETAILED DESCRIPTION OF THE PREFERRED EMBODIMENTS

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Figure 1:
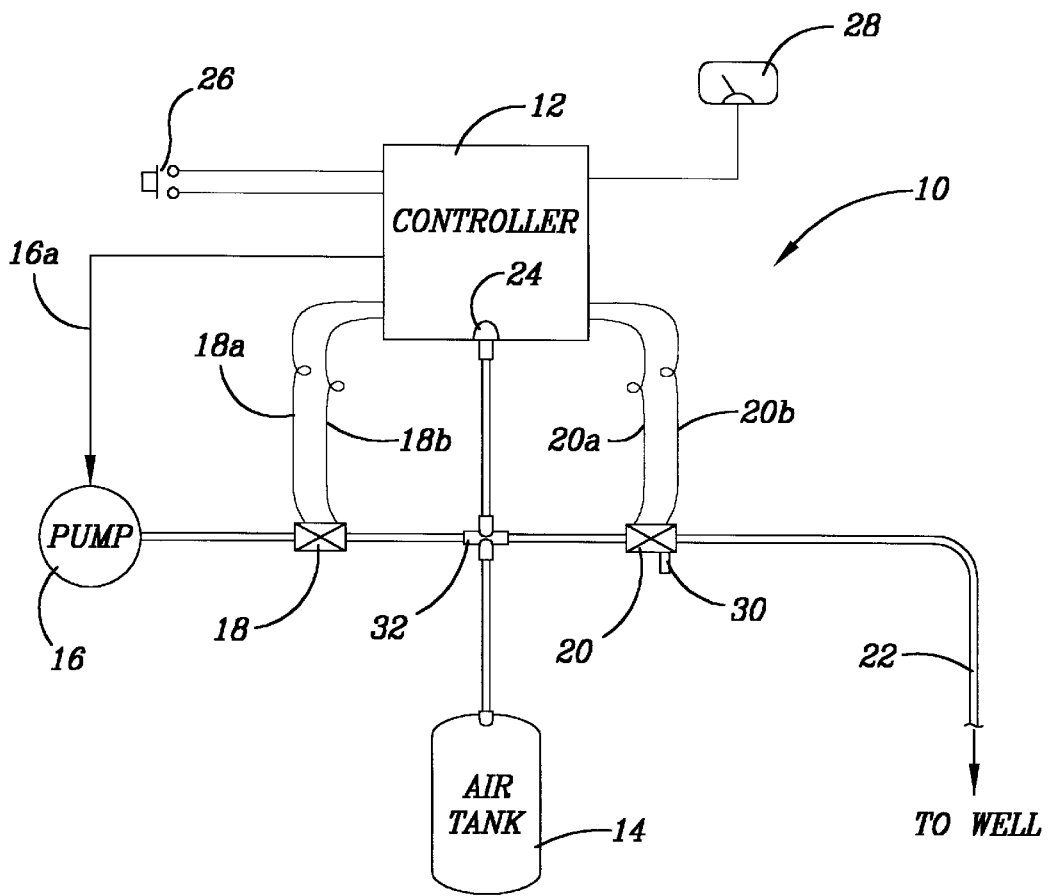
FIG. 1 is a schematic diagram of the well water level measuring apparatus of the present invention.

Referring now to the drawings in detail, where like numerals refer to like parts or elements, there is shown in FIG. 1 the well water measuring apparatus 10 of the present invention. The measuring apparatus 10 is comprised of a number of interrelated elements which can be described as follows. The heart of the measuring apparatus 10 is the controller 12 which monitors peripheral apparatus status, sends commands and information, and receives information for use in calculation and display. The controller establishes a reference pressure in the air tank 14 by sending a command signal to the pump 16 through line 16a to turn the pump 16 on to increase the air pressure in air tank 14 and off when the required pressure is present in the air tank. The air tank 14 is pressurized by turning on pump 16 and allowing air to flow through the valve 18 which is opened and monitored by the controller 12 through lines 18a, b. Valve 18 allows air from pump 16 to flow through the interconnecting piping system to the air tank 14. The air pressure is variable depending upon the depth of the well which will be described more fully hereinafter.

When the air tank 14 is being pressurized, the valve 20 is closed so as to separate the air column 22 (to the well) from the remainder of the piping system. The valve 20 is closed and monitored by the controller 12 through lines 20a, b. Valve 20, in its closed position, prohibits air flow into and down the well water air column tube 22 so that the air tank 14 can be pressurized to the desired pressure. A pressure transducer 24 is located proximate to the controller 12 so that the pressure in the piping system can be monitored at all times, or as necessary. Thus, with valve 20 closed and valve 18 open, the air tank 14 can be pressurized to the desired pressure by engaging pump 16. The pressure transducer 24 senses the increase in pressure and as the desired pressure is achieved the controller 12, which monitors the pressure transducer 24, turns off the pump 16 in response to the desired pressure being achieved.

The pressure to which the air tank 14 is charged varies directly according to the approximate depth of the well. For wells up to 200 feet in depth the pressure is set at 4 psi. For wells having depths greater than 200 feet but not greater than 400 feet the pressure is set at 8 psi. For wells having a depth greater than 400 feet but not greater than 600 feet the pressure is set at 12 psi. And for wells having a depth greater than 600 feet but not greater than 800 feet the pressure is set at 16 psi. The ratio of pressure to volume will remain substantially the same as well depth increases. The measurement pressure is derived from the volume of the air column 22 which is increased in length, but not diameter, for each greater depth well. Additionally, the air tank 14 is required to have the same volume as the air column 22 which will be explained in greater detail below in connection with the method of operation of the apparatus.

When the desired measurement pressure in the air tank 14 is achieved, the controller 12, having already disengaged the pump 16, closes valve 18 to isolate the pump 16 from the remainder of the piping system. Once this is accomplished, the well water level measurement can begin.

To initiate the well water level measurement, a start switch 26, indicated as a push button switch in FIG. 1, is engaged which begins a series of steps in the controller 12. These steps will be described in greater detail below, but for an overview, the valve 20 is opened allowing the pressurized air in the air tank 14 to flow into the tubing 22 to its distal end located near the bottom of the well creating a dynamic pressure within the tubing or air column 22. Since the tubing or air column 22 has been positioned within the well to a known depth (height), the compression of the pressurized air in the air column 22 against the transducer 24 provides a pressure differential which can be utilized to calculate the height or level of the water within the well. Once calculated the height or level of the water in the well is displayed in analog fashion as shown in FIG. 1 by the depth meter 28, or by any other means of display, e.g. digital display. When the sensing of the water level is completed and no additional monitoring is requested, an exhaust line 30 in valve 20 is utilized to return the air pressure in the piping system to ambient levels.

Figure 2:
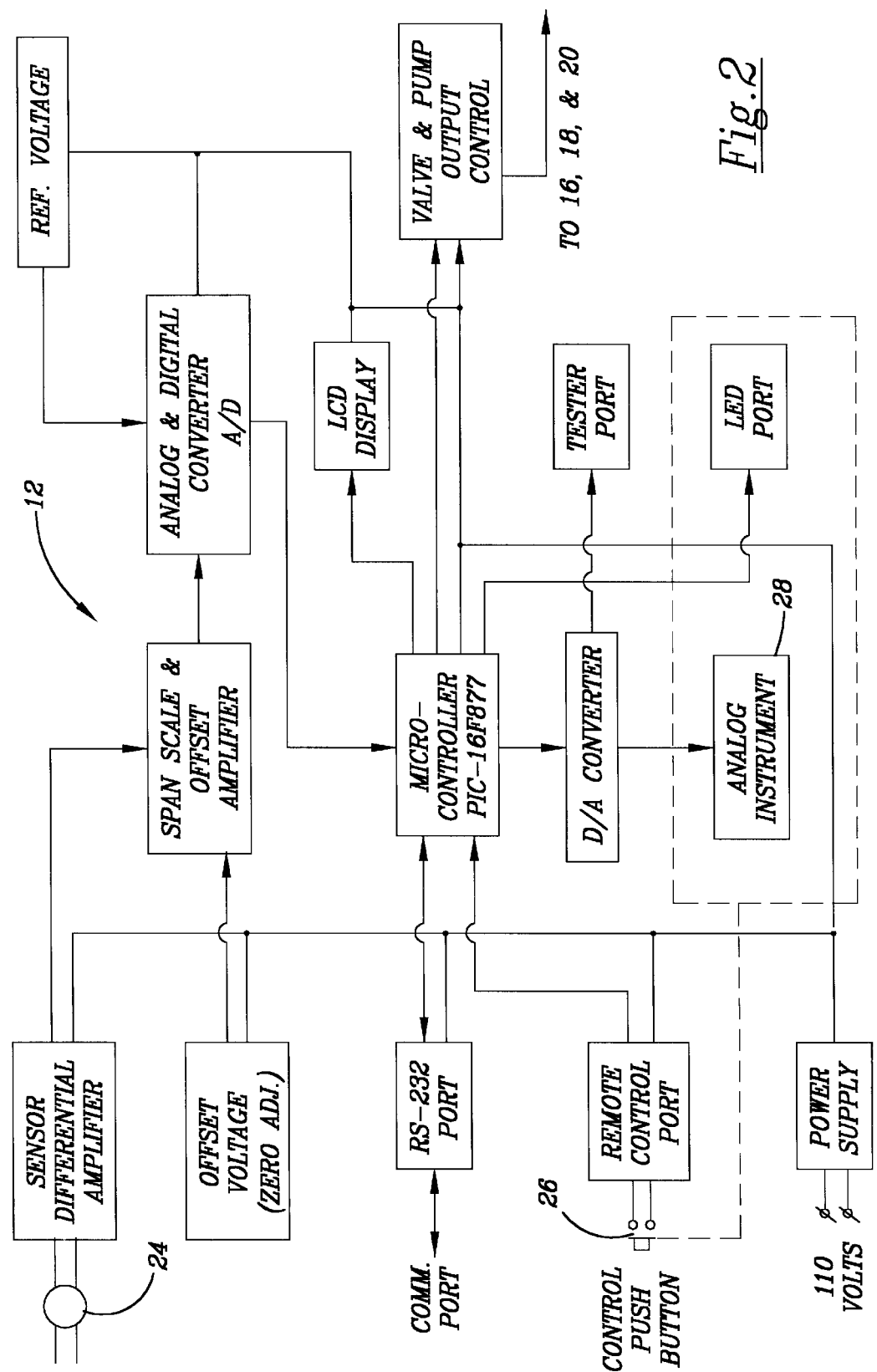
FIG. 2 is a block diagram of the various components housed within or connected to the well water level measuring apparatus of the present invention.

With reference to FIG. 2, there is shown a number of elements which are housed in, or connected to the controller 12. The central element of the controller 12 is a microprocessor which is programmed to perform the required functions of the water level measurement to be described more fully below. The microprocessor receives a measurement initiation signal from either the push button switch 26 or from a remote control through the remote control port. The remote control initialization signal mat originate with a multi-purpose computer over a communications channel, i.e. the RS232 port.

The measurement initiation signal begins the pressurization process of opening and closing valves 18 and 20, respectively, and engaging the pump 16. As the pressure is increasing, such pressure increase is monitored by the controller 12 through the pressure sensor 24 by the sensor differential amplifier. The output of the sensor differential amplifier is applied to a span scale and offset amplifier which scales the value received from the sensor 24 and which is processed into a digital value in the analog-to-digital converter and received by the microprocessor on one of its data inputs. When the desired pressure is sensed, the microprocessor begins to instruct the valves and pump in accordance with stored instructions. Pump 16 is disengaged, valve 18 is closed and valve 20 is opened to initiate the water level sensing through the air column 22 applied against the pressure transducing sensor 24.

With the desired pressure in the air column 22, the pressure transducing sensor 24 is displaced a distance proportionate to the pressure caused by the air column 22 which is directly exposed to the well water at its distal end located within the well. The sensor differential amplifier again sends its signal indicative of the sensor displacement to the span scale and offset amplifier which scales the value. This value is converted into a digital value in the A/D converter and applied to the same data input of the microprocessor. A calculation ensues in the microprocessor based upon data entered previously which is particular to the well being monitored and a value is determined. The resultant value is applied to a digital-to-analog converter and applied to an analog display instrument or gauge 28 for viewing by the user. The gauge 28 displays the depth of the well water which may be expressed in feet, gallons or liters.

The microprocessor also is capable of providing a digital readout through an LCD display controllable by the microprocessor. The controller 12 can communicate with other digital devices, e.g. multi-purpose computers, through an RS232 communications port on a bi-directional data link with the microprocessor. An LED port or output from the microprocessor gives an indication of sensing or monitoring ON, with the LED remaining on throughout the monitoring operation. Of course, the entire controller 12 and its various peripherals are powered by a standard AC power source which provides both line voltage and transformed DC voltage of +5, −5 and +12 volts to the various internal components of the controller 12.

Additionally, the microprocessor is connected to a tester port for providing a test data output from the D/A converter for checking the functions of the microprocessor. The input amplifier network, i.e. the sensor differential and the span scale and offset amplifiers, has an offset voltage applied for establishing a zero adjustment for the scaling function of the pressure differential value. The A/D converter has a reference voltage applied to accurately effect the conversion.

The controller 12 is calibrated in accordance with the following procedure. A check of the applied DC voltages is performed on the power supply outputs. An air pressure of 2 psi is applied to the pressure sensing transducer 24 looking for "0" volts at the output of the span scale and offset amplifier. If any value other than zero, the offset voltage control is adjusted to achieve a "0" voltage reading. Once this is accomplished, an air pressure (in the case of a 200 foot depth) of 4 psi is applied to the pressure sensing transducer 24 looking for "5" volts at the output of the span scale and offset amplifier. This optimizes the span scale and offset amplifier and completes the calibration of the input amplifiers. The next step is to calibrate the A/D converter by applying no pressure to the pressure sensing transducer 24 looking for "0" level on the display 28. Once this is accomplished, an air pressure of 4 psi is applied to the pressure sensing transducer 24 and the display 28 is adjusted for its maximum reading. This calibrates the analog display to read and display the values presented from the resultant calculations of the differential pressure detected by the pressure sensing transducer 24. In this manner the controller 12 is calibrated to produce accurate readings based upon its sensors and internal circuits.

In the field, the controller 12, containing all of the circuitry elements, and the mechanical elements, i.e. the pump 16, the valves 18, 20, and the air tank 14 will be mounted or positioned inside the well owner's residence or business location. A ¼ inch (internal dimension) plastic tube is connected between the controller 12 and a 4-way port 32. From the 4-way port 32, a ¼ inch (internal dimension) plastic tube is connected to the air tank 14 and separate ¼ inch plastic tubes are connected to valves 18 and 20. From the other end of valve 18 a ¼ inch plastic tube is connected to pump 16. Each of the valves 18 and 20 are connected by signal control wires to the controller 12, with pump 16 connected in the same manner. One additional ¼ inch plastic tube is connected to the other end of valve 20, which tube is cut to a length equal to the depth of the well and installed into the well alongside the well water pump piping so that its distal end is in proximity to the bottom of the well. This tube 22 creates the air column against which the pressure differential of the weight of the water in the well will be used to calculate the height (depth) of the water level from the bottom of the well.

There will be three differing installations of the air column tubing 22: new wells, existing wells, and upon pump replacement on existing wells. For a new well the installation will require only the fastening of the air column tubing 22 onto the exterior of the water line at the same time the water line is being positioned in the well with the submersible pump. The air column tubing 22 is then run from the well with the water line into the building. Once inside the building, the air column tubing 22 is connected to the valve 20 and the calibration of the apparatus is performed through the foregoing checks.

An existing well installation will require the placing of a ½ inch (internal dimension) PVC pipe into the well to the depth of the submersible pump. This pipe acts as a conduit for the air column tubing 22 and requires the tubing 22 to be secured within the bottom opening of the pipe. Securing the tubing 22 can be done by drilling two angled holes slightly larger than the tubing 22 into the PVC pipe at distances approximately 8 and 12 inches from the bottom end of the pipe. The air column tubing 22 is inserted through the drilled holes and arranged to extend to within 4 inches of the bottom opening of the pipe. The distance inside the pipe is preferred to keep dirt and other sediment from clogging the end of the air column tubing 22. The PVC pipe or conduit for carrying the air column tubing 22 to the bottom of the well can be assembled in sections of any desired length and glued together with the air column tubing 22 extending from the top of the final section which is secured to the well cap. The air column tubing 22 is passed through a pre-drilled hole in the well cap and is inserted into another series of ½ inch PVC pipe sections which are run into the building. The conduit should be insulated against moisture seepage and freezing, with the preferred method being to trench and bury the conduit. As before, the ¼ inch plastic tubing, i.e. the air column tubing 22, is connected to the valve 20 and calibration of the apparatus is performed by following the foregoing checks.

When a submersible pump is being replaced and the well water level measuring apparatus of the present invention is desired to be added, the ¼ inch air column tubing 22 is attached to the water line as the replacement submersible pump is being lowered into the well. The air column tubing 22 is then connected to the well cap and run into the building as was done for an existing well water pump using the ½ inch PVC pipe sections to create a conduit for the air column tubing 22. Once inside the building, the air column tubing 22 is connected to valve 20 and calibration is performed using the foregoing checks. In all cases extreme care should be taken to ensure that the air column tubing 22 is not crimped when fastening and bending which could produce false readings to the pressure sensing transducer 24.

Figure 3:
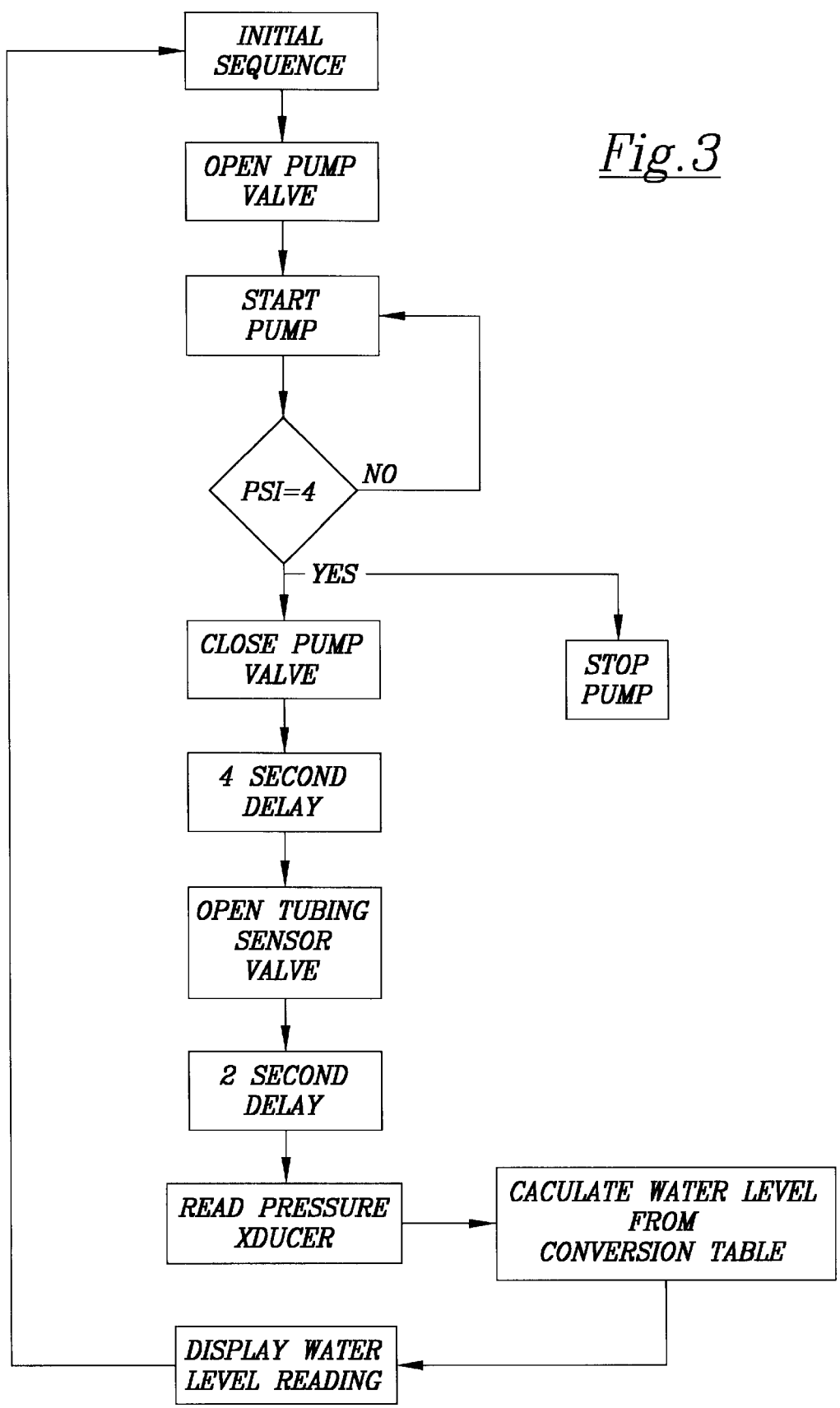
FIG. 3 is a diagrammatic scheme of the control program for the well water level measuring apparatus of the present invention.

The overall programming of the well water level sensing apparatus of the present invention can be described with reference to FIG. 3. An initializing sequence is begun on start-up which checks all inputs and outputs, closes all valves, and sets all values to zero. Once initialization is completed, the pump valve, valve 18, is opened and pump 16 is started. This effects a pressurization of the air tank 14 which is monitored by the pressure sensing transducer 24 through the 4-way port 32. The controller 12 makes a continuing inquiry checking whether the desired pressure (4 psi) has been achieved. Once the pressure sensing transducer 24 and the associated sensor differential amplifier, span scale and offset amplifier and A/D converter have performed their respective functions and transmitted the resultant value to the microprocessor indicating that the desired pressure (4 psi) has been achieved, the pump 16 is stopped and the valve 18 is closed. To make certain the instructed functions are achieved, a short delay is enabled. Following the short delay, the air column tubing valve 20 is opened and following another short delay to allow for equilibrium between the air pressure in the air tank 14 and in the air column tubing 22 values from the pressure sensing transducer 24 are accepted by the microprocessor. In all instances, the size of the air tank 14 and the volume of the air column tubing 22 are substantially identical. This requirement will cause the size of the air tank to vary in accordance with the volume of the air column 22 which increases in 20 length as the well gets deeper.

An internal calculation based upon predetermined values is initiated by the microprocessor which provides a water depth based upon the sensed pressure differential from stored values in a table. The retrieved value from the table indicative of water depth is then displayed on whichever human readable device has been selected, i.e. an analog display gauge or a digital readout. Each complete sequence may be manually started or be continually monitored at preset times for later retrieval for viewing.

Figure 4A:
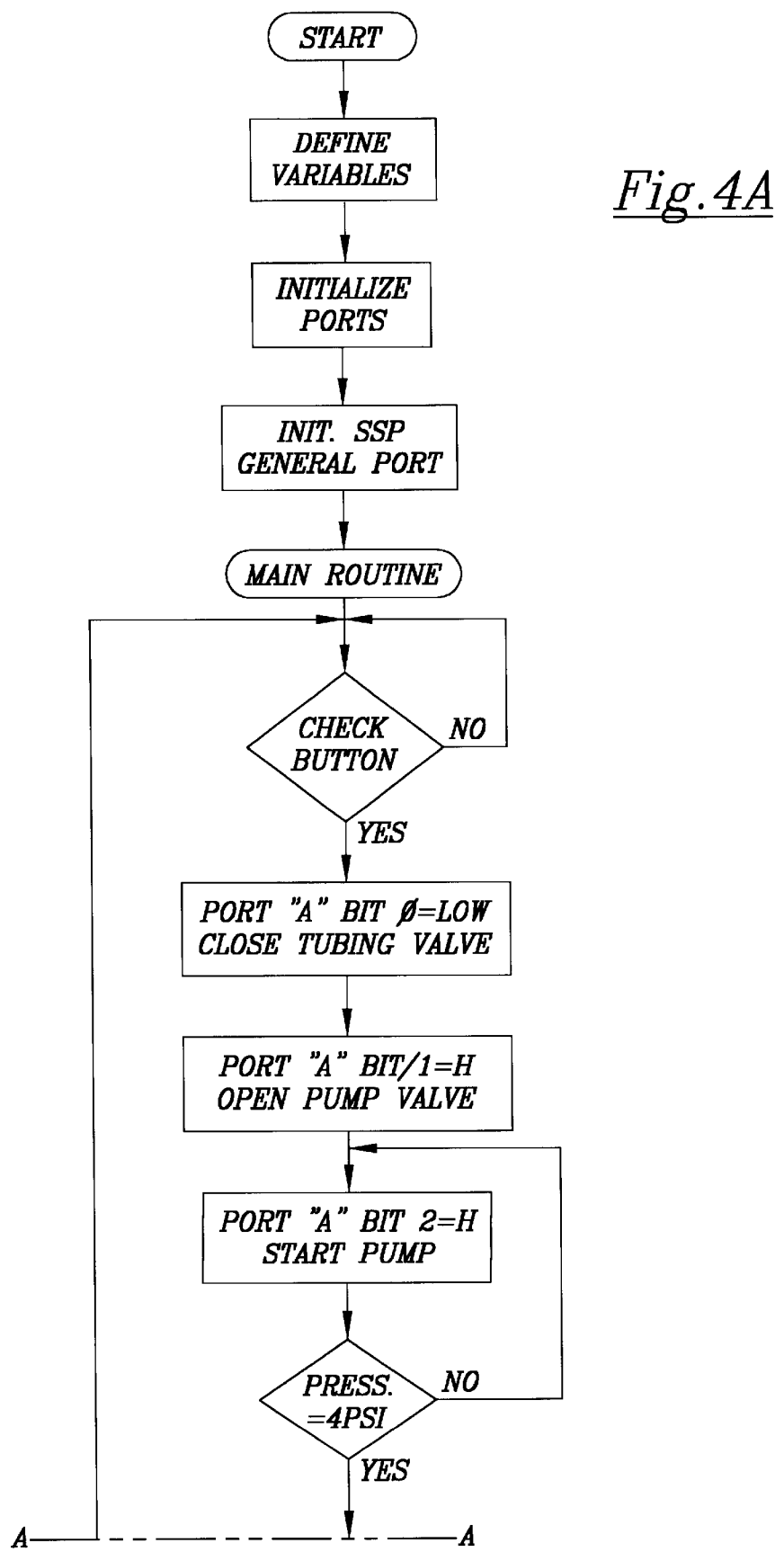
FIGS. 4A, B and C is a diagrammatic chart of the overall program control of the well water level measuring apparatus of the present invention.

A more in depth program sequence is set out in FIGS. 4A, B and C. The microprocessor in the controller 12 is programmed to perform the following tasks in the described sequenced. At start-up, the variables are defined and the ports are initialized. This includes commands to close all valves and set "0" conditions on all ports. Particularly, the signal processing data port is also initialized. On entering the main routine, the microprocessor is waiting for a signal that the manual start has been requested by depressing the push button 26. Once the microprocessor detects that the push button 26 has been depressed, a series of instructions are given. The valve 20, the tubing valve, is instructed to close. The valve 18, the pump valve, is instructed to open. The pump 16 is instructed to start. An inquiry is set to detect the desired pressure (4 psi) by the pressure sensing transducer 24 which continually provides pressure differential values until the desired pressure is sensed and the information is passed through the input amplifiers and provided (in digital format) to the microprocessor.

Figure 4B:
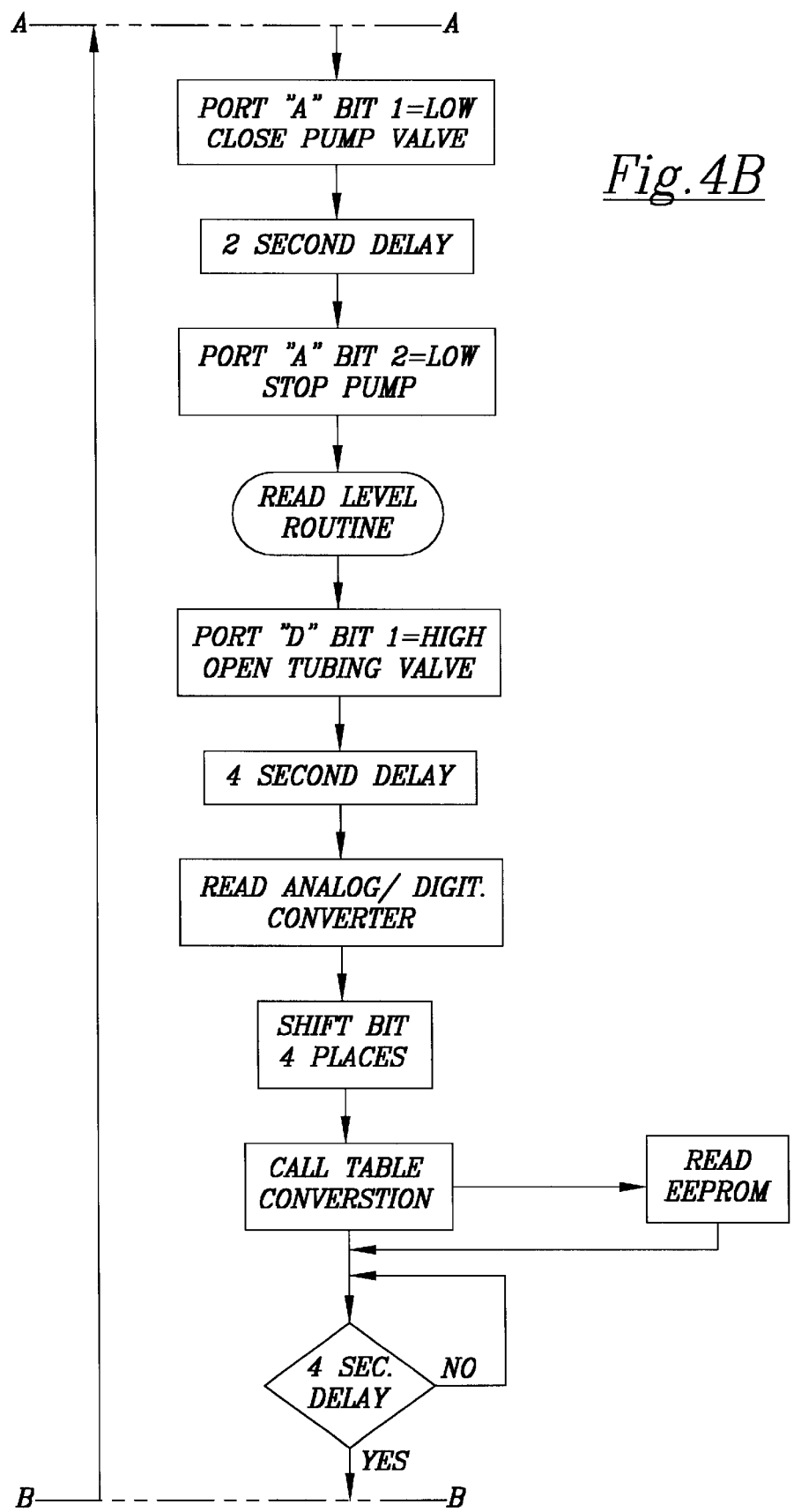

Once the desired pressure (4 psi) is detected, and referring to FIG. 4B, the pump valve 18 is instructed to close which is followed by a short delay. After the delay, the pump 16 is instructed to stop. This is followed by an instruction to the microprocessor to read the water level detection routine which requires the issuing of new instructions. The microprocessor instructs the tubing valve 20 to open followed by a short delay allowing for equilibrium to occur between the air column tube 22 and the air tank 14. Following the delay, a first reading is made of the A/D converter which produces a digital value from the input amplifiers linked to the pressure sensing transducer 24. The transducer 24 provides a differential pressure from the equalized pressure in the air column 22 and the air tank 14, which is directly exposed to the water pressure at the bottom of the well, to the input amplifiers which scale the value for the A/D converter. The output of the A/D converter is then read by the microprocessor and the value is shifted to create a unique address for the predetermined conversion table. The table conversion routine is called and the table is read based upon the shifted value received from the A/D converter. Another short delay provides for the stored value in the table to be retrieved and applied to the output conversion routine.

Figure 4C:
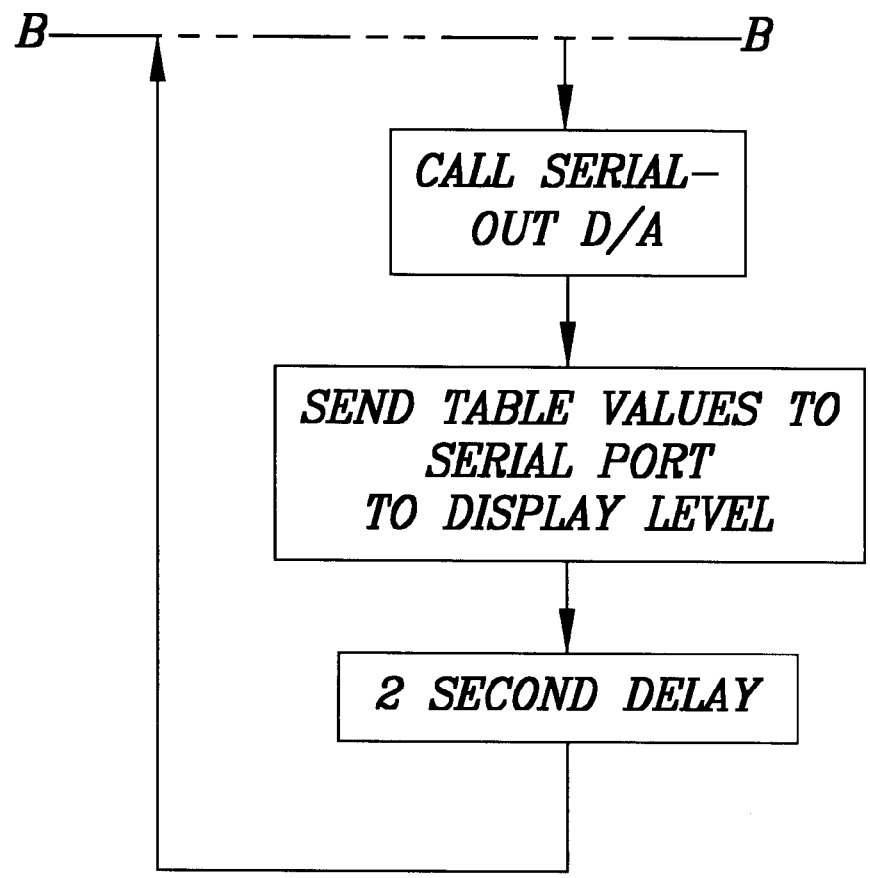

Referring to FIG. 4C, the D/A conversion is called and the retrieved stored value is sent to the selected display for viewing by the user. The analog display gauge 28 then displays the water level by displacing the arrow marker over the appropriate arc length showing the water level indication along the associated scale. This step is followed by another short delay before the microprocessor begins looking for another start request from the manual push button 26. The display will continue to retain the indicated value until cleared by the microprocessor by either program control or by manual request.

In the explanation of the programmatic sequences and in the explanation of the various arrangement and interaction of the physical elements of the invention, 4 psi is utilized as a sample desired pressure. However, it should be understood that other pressures to which the air tank 14 and the air column 22 can be charged will work similarly as the well depth increases. The important requirement is that the volume of the air tank 14 varies as the internal volume of the air column tubing 22. So that the longer the air column 22 to accommodate a deeper well the size of the air tank 14 increases to remain at the same volume.

The foregoing are examples of single well water level measurement. The present invention has the capacity to the well water depth of a plurality of wells by repeating the described sequence of well water depth measurement for each one of the plurality of wells. The present invention may also continually sense and monitor the pressure of the well water exerted against the air column by repeating the sequence at preset periodic times. This can be displayed on the visual display, or the resultant calculated water level can be communicated to the multi-purpose computing device over the communications channel for sequential storage in memory for later retrieval and viewing.

The present invention may be embodied in other specific forms without departing from the spirit or essential attributes thereof and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

We claim:

1. A method for measuring the level of water in a well utilizing pressurized air comprising the steps of:

initializing a means for controlling the sensing and monitoring of the water level measurement which first reduces pressure in an air column inserted into a well to existing ambient pressure by closing a first valving means located between a pressure sensor and the air column to exhaust and isolate the air column;

opening a second valving means located between a pump and an air tank of substantially equal volume as the air column;

starting the pump to charge the air tank to a predetermined measurement pressure and closing the second valving means to isolate the air tank as the measurement pressure is detected by the pressure sensor;

opening the first valving means equalizing the measurement pressure between the air tank and the air column to obtain a direct pressure of the well water against the distal end of the air column;

sensing the pressure of the well water exerted against the air column with the pressure sensor and calculating the water level from the resultant sensed pressure; and displaying the calculated water level on a visual display for viewing by a user.

2. The method of claim 1 further comprising the step of continually sensing and monitoring the pressure of the well water exerted against the air column by repeating the sequence at preset periodic times.

3. The method of claim 1 wherein the means for controlling the sensing and monitoring of the water level measurement includes a programmable computing device for controlling the sequence for measuring the well water depth using pressurized air.

4. The method of claim 1 further comprising the step of receiving instructions over a communications channel from a multi-purpose computer to perform the well water depth measurements and providing well water depth measurements to said computer over said communications channel.

5. The method of claim 1 further comprising the step of selectively sensing and monitoring the well water depth of a plurality of wells by repeating the sequence for each well water depth measurement for each one of the plurality of wells.

6. Apparatus for measuring well water depth using pressurized air comprising:

a means for controlling the sensing and monitoring of water level measurements subject to program control for sequencing the order of operation of a first and a second valving means, an air tank, an air column, a pressure sensor, and a visual display;

said first valving means operatively connected between the pressure sensor and the air column, having its distal end inserted into a well, to reduce pressure in the air column to existing ambient pressure by exhausting said air and isolating the air column;

said second valving means operatively connected to a pump and an air tank of substantially equal volume as the air column, and to the pressure sensor, to couple the air tank to the air column upon the sensing of a predetermined measurement pressure being detected in the air tank by the pressure sensor, said pump being capable of charging the air tank to said predetermined measurement pressure;

said pressure sensor being capable of directly sensing the pressure of the well water exerted against the distal end of the air column, following the equalizing of the predetermined measurement pressure between the air tank and the air column, and to provide said sensed pressure to the controller for calculating the water level in the well from the sensed pressure, and displaying the calculated water level on the visual display.

7. The apparatus of claim 6 wherein the controller continually senses and monitors the pressure of the well water exerted against the distal end air column by repeating the sequence of operation at preset periodic times.

8. The apparatus of claim 6 wherein the controller receives instructions over a communications channel from a multi-purpose computer to perform the well water depth measurements and provides well water depth measurements to said computer over said communications channel.

9. The apparatus of claim 6 wherein said controller selectively senses and monitors the well water depth of a plurality of wells by repeating the sequence of operation for each well water depth measurement for each one of the plurality of wells.

* * * * *